(12) United States Patent
Iwago et al.

(10) Patent No.: US 8,098,411 B2
(45) Date of Patent: Jan. 17, 2012

(54) IMAGE READING APPARATUS

(75) Inventors: Toshitaka Iwago, Okazaki (JP); Takashi Ohama, Iwakura (JP); Satoru Nakakita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1216 days.

(21) Appl. No.: 11/214,909

(22) Filed: Aug. 31, 2005

(65) Prior Publication Data

US 2006/0044633 A1    Mar. 2, 2006

(30) Foreign Application Priority Data

Aug. 31, 2004  (JP) ................................ 2004-251941
Mar. 16, 2005  (JP) ................................ 2005-075072

(51) Int. Cl.
*H04N 1/04* (2006.01)
(52) U.S. Cl. ........ 358/498; 358/474; 399/367; 399/361; 271/3.14; 271/8.1
(58) Field of Classification Search .................. 358/496, 358/498, 474, 96; 399/367, 361; 271/3.14, 271/8.1
See application file for complete search history.

(56) References Cited

U.S. PATENT DOCUMENTS

| 4,822,021 | A | 4/1989 | Giannetti et al. | |
|---|---|---|---|---|
| 5,884,117 | A * | 3/1999 | Tanoue et al. | 399/1 |
| 5,995,801 | A * | 11/1999 | Katsuta et al. | 399/367 |
| 7,021,619 | B2 * | 4/2006 | Watanabe et al. | 271/3.14 |
| 7,380,787 | B2 * | 6/2008 | Fukumura | 271/264 |
| 2004/0081495 | A1 | 4/2004 | Nakamura | |
| 2004/0246540 | A1 * | 12/2004 | Makino | 358/498 |

FOREIGN PATENT DOCUMENTS

| CN | 1497370 | 5/2004 |
|---|---|---|
| JP | 2-502715 T | 8/1990 |
| JP | 10-181931 A | 7/1998 |
| JP | 11-46295 A | 2/1999 |
| JP | 2000-351470 A | 12/2000 |
| JP | 2002084424 | 3/2002 |
| JP | 2002-189319 A | 7/2002 |
| JP | 2002-193472 A | 7/2002 |
| JP | 2002335372 | 11/2002 |
| JP | 2003076074 | 3/2003 |
| JP | 2003198810 | 7/2003 |
| JP | 2003222959 | 8/2003 |

OTHER PUBLICATIONS

Chinese Office Action in application No. 10099637.1 dated Aug. 24, 2007.
JP Office Action dtd May 27, 2009, JP Appln. 2004-251941.

* cited by examiner

*Primary Examiner* — King Poon
*Assistant Examiner* — Lawrence Wills
(74) *Attorney, Agent, or Firm* — Banner & Witcoff, Ltd

(57) ABSTRACT

There is disclosed an image reading apparatus which comprises a document feeder, a reading unit, and a guide device. The document feeder includes a feeder roller and feeds a document sheet with an image thereon, along an outer circumferential surface of the feeder roller. The reading unit has a reading surface opposed to the outer circumferential surface of the feeder roller, and reads, at a reading position, the image on the document sheet being fed. The guide device has a guide surface, and is disposed to be opposed to the reading surface of the reading unit, so as to guide the document sheet along the guide surface to the reading position. The outer circumferential surface of the feeder roller, and at least an opposed portion of the guide surface at which the guide surface is opposed to the reading surface, have a substantially same color.

27 Claims, 8 Drawing Sheets

IMAGE READING APPARATUS

INCORPORATION BY REFERENCE

The present application is based on Japanese Patent Applications No 2004-251941, filed on Aug. 31, 2004, and No. 2005-075072, filed on Mar. 16, 2005, the contents of which are incorporated herein by reference.

BACKGROUND OF THE INVENTION

1. Field of the Invention

The invention relates to an image reading apparatus for reading, at a reading position, an image on a sheet of a document fed from a sheet supply tray to a catch tray along a feed pathway.

2. Description of Related Art

There is known an image reading apparatus which is incorporated in a copy machine, a scanner, and a multifunction apparatus implemented with a copy function and a scanner function, and which comprises a document feeding mechanism for feeding a sheet of a document from a sheet supply tray to a catch tray through a feed pathway, and an image reader such as CCD (Charge Coupled Device) and CIS (Contact Image Sensor), disposed at a position in the document feeding mechanism to read an image on the document sheet as being fed through the feed pathway.

In a conventional image reading apparatus, an automatic document feeding mechanism called ADF (an Auto Document Feeder) feeds a sheet of a document onto a platen glass, and an image scanner under the platen glass reads an image on the document sheet as being fed over the platen glass. A guide device consisting of a plurality of guide parts are disposed to be opposed to the platen glass so as to guide the document sheet to a predetermined position on the platen glass. The ADF includes a feeder roller, and a plurality of pinch rollers arranged along a circumference of the feeder roller, and the document sheet is fed along a feed pathway by being nipped between the feeder roller and each of the pinch rollers.

The CCD or CIS used as the image sensor has a light source which emits light toward the platen glass. The light emitted from the light source is reflected by a surface of the document sheet being fed over the platen glass, and incident back on the image sensor. The image sensor converts the received light into an electrical signal. When reading the image in this way, a problem is encountered that where the document sheet is relatively thin, an image on a backside of the document sheet which is opposite to a side whereon the image to be read is present undesirably shows through the thickness of the document sheet, as described in JP-A-2002-84424 and JP-A-2003-198810.

More specifically, the guide device and the feeder roller are disposed to be opposed to the platen glass. The feeder roller is driven or rotated, and each guide part of the guide device and the feeder roller 94 are spaced from each other by a suitable amount of clearance. Thus, at the position to be opposed to the platen glass, each guide part of the guide device and the feeder roller are disposed with the clearance therebetween in a direction of a width of the document sheet, which is parallel to a direction of a driving shaft of the feeder roller.

When the thin document sheet is fed over the platen glass, the light emitted from the image sensor is partially transmitted through the document sheet and reaches the guide device and the feeder roller to be reflected thereby. The thus reflected light is again transmitted through the document sheet to be incident back on the image sensor. The part of the light reaching the clearances between the feeder roller and the respective guide parts of the guide device, travels straight into the ADF, and accordingly does not return to the image sensor. In this way, at places where the guide parts of the guide device and the feeder roller are present, the light as reflected by the guide device and the feeder roller, and the light as reflected by the document sheet, are received in superimposition by the image sensor, while at places corresponding to the clearances between the feeder roller and the respective guide parts of the guide device, only the light as reflected by the document sheet is received by the image sensor. Since reflectance is different between the guide device and the feeder roller, and the emitted light is not reflected at the clearances between the feeder roller and the respective guide parts of the guide device, the image as read by the image sensor includes a show-through in the form of stripes in a direction of feeding of the document sheet and corresponding to the variation in intensity of reflected light, including the non-presence of reflected light at the places corresponding to the clearances.

In a technique disclosed in the above-mentioned first publication JP-A-2002-84424, a plurality of document sheets having respective levels of light transmittance are read in order to obtain data representative of a relationship between light transmittance of document sheet and show-through, in advance of an actual use of the image reading apparatus. The obtained show-through-transmittance relationship data is stored in a storage medium for an apparatus incorporating the image reading apparatus. When images on sheets of a document are to be read, the transmittance of each document sheet is initially measured. Then, show-through information corresponding to the measured transmittance value is retrieved from the stored show-through-transmittance relationship data. Then, image data representative of an image on one of the document sheets is obtained by reading that image on the document sheet, and the image data is corrected based on the show-through information by eliminating a show-through component from the image data, In a technique disclosed in the above-mentioned second publication JP-A-2003-198810, when an image of a document is to be read, the transmittance of a sheet of the document is measured first. Then, relevant control variables, such as amount of light to be emitted from the image sensor toward document sheet, are changed in accordance with the obtained transmittance value. Thus, when the measured transmittance value indicates that show-through will occur, it is controlled such that an amount of light to be transmitted through the document sheet decreases, so as to prevent a show-through component from being included in a read image.

However, according to the technique of the first publication, it is required to measure the transmittance of each document sheet before reading an image, as well as provide calculating means for carrying out operations associated with the image correction. Further, since such operations are carried out while the document sheet is being fed over the platen glass, the rate of reading undesirably lowers. Still further, the measurement for obtaining the show-through-transmittance relationship data is necessitated, and the means for storing this data is also required. The need for the calculating means and the storing means increases the number of components of the image reading apparatus, resulting in an increase in the size and cost of the image reading apparatus.

On the other hand, according to the technique of the second publication, it is required to measure the light transmittance of the document sheet, and change the control variables such as the amount of light emitted by the image sensor toward the document sheet, in accordance with the measured transmittance value. Hence, the reading rate lowers and the cost of the image reading apparatus increases.

Meanwhile, there are known two types of ADF, namely, a downward feeding type as disclosed in JP-A-2003-76074, and an upward feeding type as disclosed in JP-A-2002-335372. In the former type, a substantially U-shaped feed pathway is formed for feeding each document sheet from a sheet feed portion disposed in an upper portion of the ADF, to a catch portion disposed in a lower portion of the ADF, via a reading position. In the latter type, a substantially U-shaped feed pathway is formed for feeding each document sheet from a sheet feed portion disposed in a lower portion of the ADF, to a catch portion disposed in an upper potion of the ADF, via a reading position. In either of the two types, the feed pathway is substantially U-shaped to reverse a document sheet while the document sheet is fed therealong, thereby reducing the overall size of the ADF.

The ADF includes a plurality of feeder roller pairs disposed along the feed pathway so as to feed the document sheet with high accuracy and precision. Each feeder roller pair comprises a drive roller driven by a drive source, and a driven roller disposed adjacent to the drive roller to be driven by the drive roller, so that the document sheet is fed by being sequentially nipped between the roller pairs, along the substantially U-shaped pathway reversing the document sheet.

However, the ADF having the substantially U-shaped pathway with the plurality of feeder roller pairs suffers from a high component cost when the number of the feeder roller pairs is large. Further, because of a variation in diameter of the drive rollers, the rotation varies among the drive rollers, adversely affecting the feeding of the document sheet.

SUMMARY OF THE INVENTION

Meanwhile, there is known a technique to have a drive roller and a driven roller in elastic contact with each other, in order to prevent an irregularity in feeding the document sheet.

In view of this, the present applicant has proposed to simplify the ADF by forming the substantially U-shaped feed pathway by utilizing an outer circumferential surface of a single reversing drive roller, which has a large diameter and comprises a driving shaft and a roller body of an elastic material covering the driving shaft so that the driving shaft and the roller body is integrally rotatable, while enhancing the feed accuracy by providing a plurality of driven rollers arranged along the reversing drive roller and biased onto the drive roller. There are two ways to make the diameter of the reversing drive roller large, namely: making a diameter of the driving shaft large; and making a thickness of the roller body covering the driving shaft large. Since the former way pushes up the manufacturing cost of the driving shaft, the applicant has decided to employ the latter way.

With the latter way, that is, when the thickness of the roller body (or a dimension of the roller body in a radial direction perpendicular to an axis of the drive roller) is made large, a distance between an inner circumferential surface of the roller body on the driving shaft to an outer circumferential surface of the roller body to be in contact with the document sheet increases, causing the following problem. Where a separator for separating each document sheet from a stack of document sheet set on the sheet supply tray so as to feed the document sheets one by one, is disposed on the upstream side of the reversing drive roller in the feeding direction, a frictional force imposed by the separator on the document sheet for separation thereof from the other sheets of the stack acts to pull the document sheet backward. Since the document sheet is fed by being wound around the outer circumferential surface of the roller body, when the driving shaft of the reversing drive roller rotates to feed the document sheet, a back tension is imparted on the roller body, rotating the outer circumferential surface of the roller body relative to the driving shaft of the feeder roller due to an elastic deformation of the roller body in a circumferential direction of the roller body. Since the roller body is formed of a material elastically deformable, when the driving shaft starts rotating, there is caused a delay in start of feeding or turning of the document sheet, which corresponds to rotational displacement of the outer circumferential surface of the roller body, with respect to the start of rotation of the driving shaft. The length of the delay corresponds to a time taken until the back tension and a resilience of the roller body being elastically deformed as described above, come to balance.

It is sometimes the case that when an image reading apparatus reads an image on a document sheet, scan or reading for an entirety of a single document sheet can not be performed by one continuous operation without any intermission and at a constant rate throughout the reading of the single document sheet. In other words, it is sometimes the case that reading of a single document sheet is performed such that the reading is temporarily suspended, or the reading rate is lowered. For instance, in a data transmission by facsimile function, when a capacity of a buffer memory of an apparatus at the receiving side becomes insufficient for some reasons and thus a speed of data processing is lowered at the receiving apparatus, or when a rate of data transmission is low due to the communication line in bad condition, the sheet feeding is suspended with a stop of generation of new data to be sent out since the speed of the data processing is too low to keep pace with the sending out of the data, or the rate of the sheet feeding is lowered to increase a time taken for the data processing. Such a temporal suspension or retard in reading a single document sheet tends to be made when a large amount of data is being read, for example, when the data transmitted is of a color image.

When the sheet feeding is stopped, the back tension, which is generated by feeding of the document sheet, is reduced, thereby disrupting the balance between the back tension and the resilience of the roller body being elastically deformed as described above.

Accordingly, the driving shaft of the reversing drive roller is placed in a state fixed by the drive source currently not operated, and thus an outer circumferential portion of the roller body rotates in a direction to advance the sheet, i.e., toward the downstream side in the feeding direction, by a slight amount, to eliminate the above-described circumferential elastic deformation generated at the roller body. The inventors of the present invention have confirmed in experiment that the document sheet is also slightly displaced with this slight rotational displacement of the outer circumferential portion of the roller body.

As the data processing progresses, a room is made in the buffer memory, and reading for the document sheet is resumed. However, due to the slight advancement of the document sheet during the suspension, it is impossible to resume the reading precisely from the position where the reading was stopped.

When such a temporal suspension and resumption of feeding are repeated during reading for a single document sheet, an irregularity in feeding the document sheet occurs upon the suspension, resulting in deterioration in the reading capability of the image reading apparatus.

The present invention has been developed in view of the above-described situations, and it is therefore a first object of the invention to provide means for easily preventing the show-through due to the feeder roller and guide device, without increasing the number of components.

A second object of the invention is to solve the problem of the irregularity in feeding document sheet, including that caused by suspension of the feeding, during a single document sheet is fed, in order to further improve the reading capability of the image reading apparatus.

To attain the first object, a first aspect of the invention provides an image reading apparatus which comprises a document feeder, a reading unit, and a guide device. The document feeder includes a feeder roller and feeds a document sheet with an image thereon, along an outer circumferential surface of the feeder roller. The reading unit has a reading surface opposed to the outer circumferential surface of the feeder roller, and reads, at a reading position, the image on the document sheet being fed. The guide device has a guide surface, and is disposed to be opposed to the reading surface of the reading unit, so as to guide the document sheet along the guide surface to the reading position. The outer circumferential surface of the feeder roller, and at least an opposed portion of the guide surface at which the guide surface is opposed to the reading surface, have a substantially same color.

The feature that the outer circumferential surface of the feeder roller, and at least the opposed portion of the guide surface at which the guide surface is opposed to the reading surface, have a substantially same color, may be implemented in either of the following two ways: the outer circumferential surface of the feeder roller and the portion of the guide surface have a same color; and the outer circumferential surface and the portion of the guide surface have respective colors which are slightly different. That is, the outer ciraumferential surface of the feeder roller and the portion of the guide surface may have differing colors, as long as the degree of the color difference is so small that the above-mentioned show-through can be eliminated without employing the techniques disclosed in JP-A-2002-84424 and JP-A-2003-198810.

The reading unit reads the image on the document sheet fed over the reading surface. A plurality of members at least including the feeder roller and the guide device whose outer circumferential surface and guide surface, respectively, are opposed to the reading surface of the reading unit. Where the document sheet is relatively thin, a part of the light emitted from the reading unit is transmitted through the document sheet and reflected by the outer circumferential surface of the feeder roller and the guide surface of the guide device. The reflected light affects the read image, but in the arrangement where the outer circumferential surface and the guide surface, which respectively reflect the light, have a substantially same color, a density difference in the read image due to the difference in reflectance between the reflecting surfaces does not occur.

The image reading apparatus of the invention reduces an influence, in the form of show-through, of the feeder roller and the guide device which are opposed to the reading surface, on the read image.

To attain the second object of the invention, a second aspect of the invention adapts the image reading apparatus such that the document feeder comprises a feed pathway along which the document sheet is fed from a sheet feed tray to a catch tray via the reading position, and changes a feeding rate during feeding of a single document sheet, and the image reading apparatus further comprises an upstream feeding portion and a downstream feeding portion. The upstream feeding portion comprises a first driving roller and a first contact member elastically contacting the first driving roller when the document sheet is not nipped therebetween. The first driving roller and the first contact member function to separate each of a plurality of document sheets stacked on the sheet feed tray, from the other document sheets, and feed the document sheets one by one. The downstream feeding portion comprises a second driving roller provided by the feeder roller, which passes the document sheet, which has been fed by the upstream feeding portion, to the catch tray via the reading position, and a second contact member elastically contacting the second driving roller when the document sheet is not nipped therebetween. The second driving roller comprises a driving shaft, an elastic roller body, and a restricting member. The elastic roller covers the driving shaft such that the second driving roller is integrally rotatable, and an outer circumferential surface of the roller body is opposed to the reading surface of the reading unit. The restricting member restrains rotational displacement of the outer circumferential surface of the roller body relative to a driving shaft of the feeder roller due to an elastic deformation of the roller body in a circumferential direction of the roller body during the document sheet is fed. The restricting member rotates with the driving shaft.

According to the present document feeder, the restricting member is attached to the second driving roller or the feeder roller to restrain the rotational displacement of the outer circumferential surface of the roller body relative to the driving shaft of the feeder roller due to the elastic deformation of the roller body in the circumferential direction of the roller body. Hence, there is prevented an irregularity in feeding the document sheet due to the elimination of the above-described circumferential elastic deformation when the feeding rate is changed during the document sheet is being read or scanned. The change in the feeding rate includes a suspension of the feeding. Accordingly, the reading capability of the image reading apparatus is enhanced. When this document feeder is used in combination of the above-described arrangement of the image reading apparatus where the outer circumferential surface of the feeder roller and the guide surface of the guide device have a substantially same color, at least at their portions opposed to the reading surface of the reading unit, the reading capability is particularly excellently enhanced. However, the accuracy of reading an image can be enhanced by employing this document feeder solely, without such an arrangement of the image reading apparatus.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Hereinafter, there will be described a multifunction apparatus according to one embodiment of the invention, by referring to the accompanying drawings.

Figure 1:
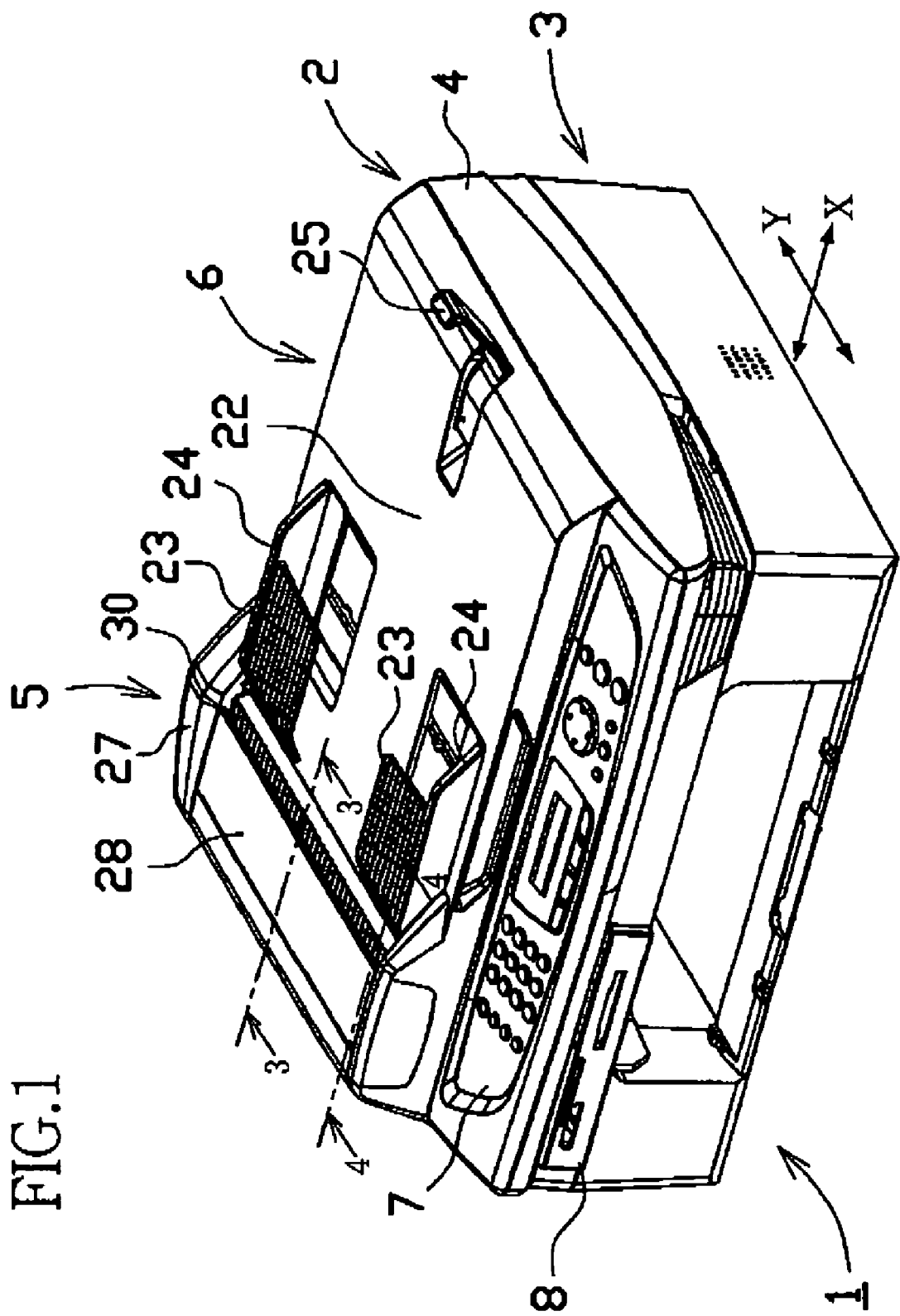
FIG. 1 is a perspective view of a multifunction apparatus according to one embodiment of the invention.

FIG. 1 is an exterior view of the multifunction apparatus 1 (or MFD: Multi Function Device). The multifunction apparatus 1 integrally has a scanner function, a printer function, and a facsimile function. An upper portion and a lower portion of the multifunction apparatus 1 are constituted by a scanner portion 2 and a printer portion 3, respectively. The scanner portion 2 is for reading an image on a sheet of a document, and the printer portion 3 is for recording an image on a recording sheet. An image reading apparatus according to the invention is embodied as the scanner portion 2, and thus the other functions such as the printer function are optional and may be omitted. For instance, the image reading apparatus of according to this invention may take the form of a scanner having scanner function only.

There will be described in detail a structure of the scanner portion 2.

Figure 3:
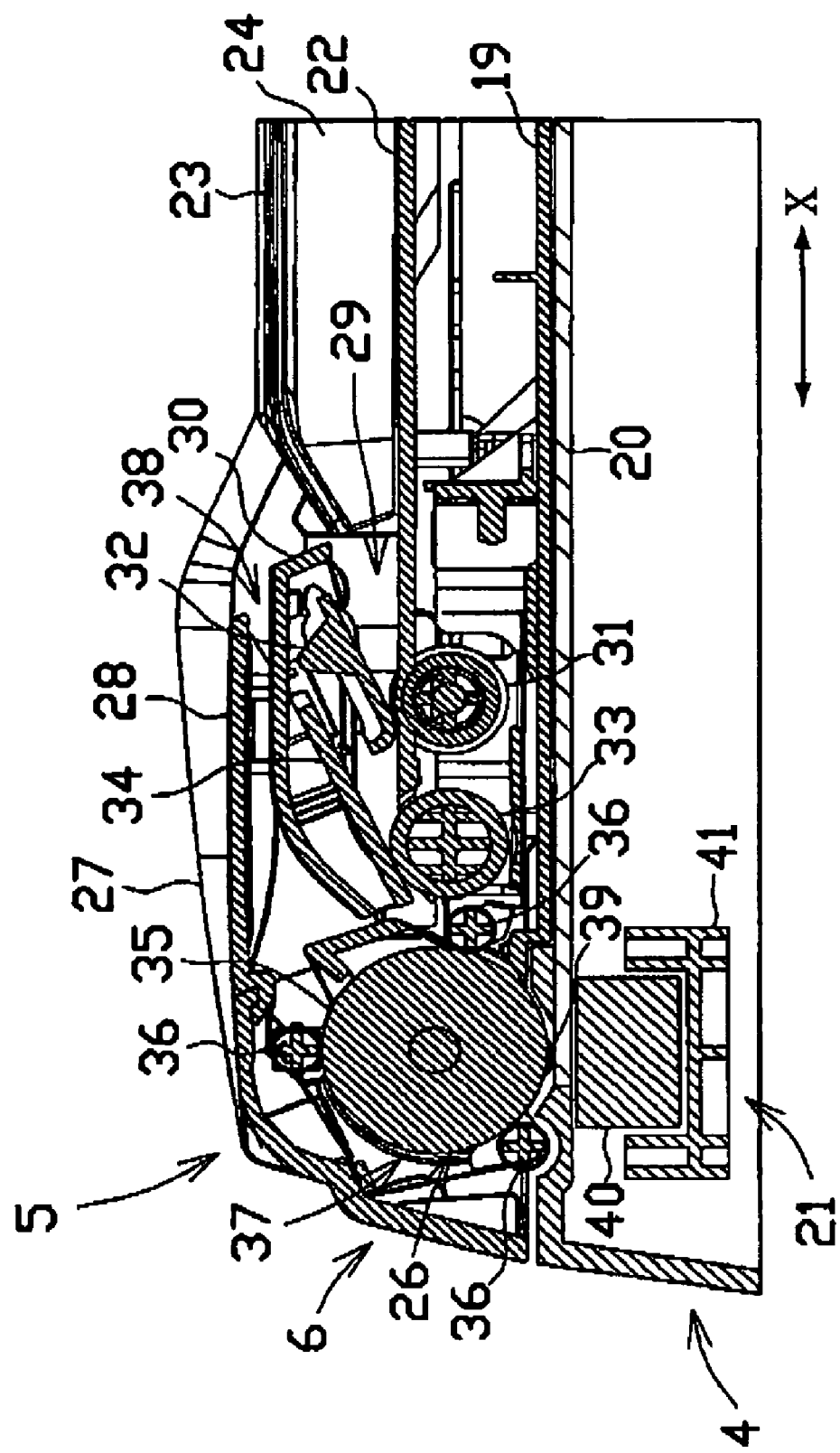
FIG. 3 is a cross-sectional view of a general structure of the ADF, taken along line 3-3 in FIG. 1.
Figure 4:
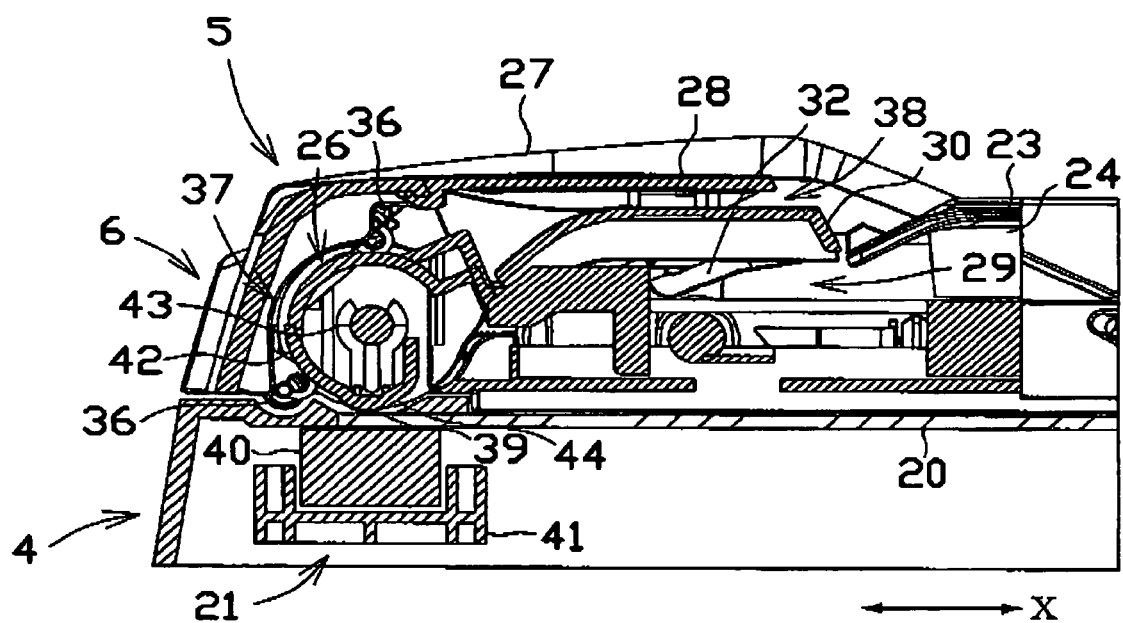
FIG. 4 is another cross-sectional view of the general structure of the ADF, taken along line 4-4 in FIG. 1.

As shown in FIG. 1, the scanner portion 2 comprises a reading table 4 on which a document sheet is placed by a user when the scanner portion 2 is used as an FBS (Flatbed Scanner), and a sheet pressing cover structure 6 having an ADF (Auto Document Feeder) 5 and attached to the reading table 4 by means of a hinge on a backside of the multifunction apparatus, to be capable of being opened/closed. The reading table 4 is formed as a housing of the multifunction apparatus 1, and a platen glass 20 shown in FIGS. 3 and 4 is disposed on an upper surface of the reading table 4 opposed to the sheet pressing cover structure 6. The reading table 4 incorporates an image reading unit 21 constituting a reading unit, such that the image reading unit 21 is opposed to the platen glass 20. When the scanner portion 2 is used as FBS, the sheet pressing cover structure 6 is opened, a document sheet is placed on the platen glass 20, and the sheet pressing cover structure 6 is closed to hold the document sheet on the platen glass 20. Thereafter, the image reading unit 21 is moved along a surface of the platen glass 20 to read an image on the document sheet.

On an undersurface of the sheet pressing cover structure 6, there is disposed a pressing member 19 formed of a sponge material and a white plate, for instance. In the image reading apparatus according to the invention, the function of the FBS is optional that is, the present invention may be embodied as an image reading apparatus comprising the ADF 5, but not provided with the function of the FBS.

Document sheets are stacked in a sheet feed tray 22, and the sheet pressing cover structure 6 has the ADF 5 for continuously feeding each of the document sheets from the sheet feed tray 22, to a catch tray 23 via a feed pathway 26. During a document sheet is fed by the ADF 5, the document sheet passes a reading position 39 corresponding to a line which is parallel to a main scanning direction of the image reading unit 21 (i.e., a Y-axis direction as shown in FIGS. 1, 2 and 5-7, which is perpendicular to an X-axis direction which is the direction in which the document sheet is fed), and present in an upper surface of the platen glass 20 under which is disposed the image reading unit 21 to read the image on the document sheet. The parallel line in the upper surface of the platen glass 20 will be referred to as "the reading line" hereinafter. Details of the ADF 5 will be provided later.

In an exterior, front face of the reading table 4, there is disposed an operator panel 7 in which are arranged operation buttons, a liquid crystal display portion, and others. The multifunction apparatus 1 operates in response to instructions inputted by the user through the operator panel 7. When connected to a computer, the multifunction apparatus 1 can operate in response to instructions sent from the computer via a printer driver, a scanner driver, or the like, in addition to the instructions inputted through the operator panel 7.

At an upper left place in the front face of the multifunction apparatus 1, there is provided a slot portion 8 into which various kinds of recording media in the form of small memory cards are inserted or loaded. The user can input, through the operator panel 7, instructions to have the multifunction apparatus 1 read out image data recorded in a small memory card as loaded in the slot 8, present in the liquid crystal display portion information related to the image data, and record a desired image on a recording sheet by means of the printer portion 3.

As shown in FIGS. 1 and 3, the sheet feed tray 22 and the catch tray 23 are formed in the sheet pressing cover structure 6 such that the sheet feed tray 22 is disposed over the catch tray 23. More specifically, an upper surface of the sheet pressing cover structure 6 constitutes the sheet feed tray 22. A plurality of sheets of a document, images on which are to be read using the ADF 5, are stacked on the sheet feed tray 22, with front ends, in a direction of feeding (hereinafter referred to as "&the feeding direction"), of the document sheets inserted into the ADF 5. The sheet feed tray 22 has a pair of sheet guides 24 spaced from each other in a front-rear direction of the multifunction apparatus 1, such that the sheet guides are displaceable in the front-rear direction. More specifically, the sheet guides 24 stand upright from the upper surface of the sheet pressing cover structure 6 constituting the sheet feed tray 22, so as to limit displacement, in a width direction, of the document sheets placed on the sheet feed tray 22 or the upper surface of the cover structure 6, and a sliding movement of one of the sheet guides 24 in a first direction makes the other sheet guide 24 to move in a second direction opposite to the first direction, by means of a well-known interlock arrangement.

That is, when a width of the document sheets is relatively small and a front-side one of the sheet guides 24 is slid to the rear side, the other, rear-side one of the sheet guides 24 also slides, but to the front side. Thus, the displaceable width range within which the document sheets can move is reduced, with a middle point of the displaceable width range in the front-rear direction kept at the center of the displaceable width range. On the other hand, when the width of the document sheets is relatively large, the front-side sheet guide is slid to the front side, and this makes the other sheet guide 24 slide to the rear side, since the two sheet guides 24 are interlocked with each other. Thus, the displaceable width range defined between the pair of sheet guides 24 is increased.

The catch tray 23 comprises two segments, which are integrally formed with the sheet guides 24, respectively, such that the catch tray 23 is over the sheet feed tray 22. Two opposite end portions, in its width direction, of a document sheet ejected from the ADF 5 are received by the two segments of the catch tray 23 and rests thereon, separated from the document sheet or sheets on the sheet feed tray 22. Since a length of the segments of the catch tray 23 in an ejecting direction is smaller than a length of a regular document sheet, a front end portion, in the ejecting direction, of the ejected sheet hangs down from the catch tray 23 to be partially on the sheet feed tray 22. In this way, the front end portion of the ejected document sheet on the catch tray 23 overlaps a rear end portion, in the feeding direction, of the document sheets or sheet on the sheet feed tray 22. However, a front end portion, in the ejecting direction, of each document sheet on the sheet feed tray 22 and a rear end portion, in the feeding direction, of each document sheet on the catch tray 23 are supported to be vertically spaced from each other by the catch tray 23, thereby preventing the ejected sheets from being mixed with the sheets on the sheet feed tray 22. The catch tray 23 having a relatively small length reduces a required space on the upper side of the sheet pressing cover structure 6, enabling to reduce the thickness and overall size of the multifunction apparatus 1.

Figure 2:
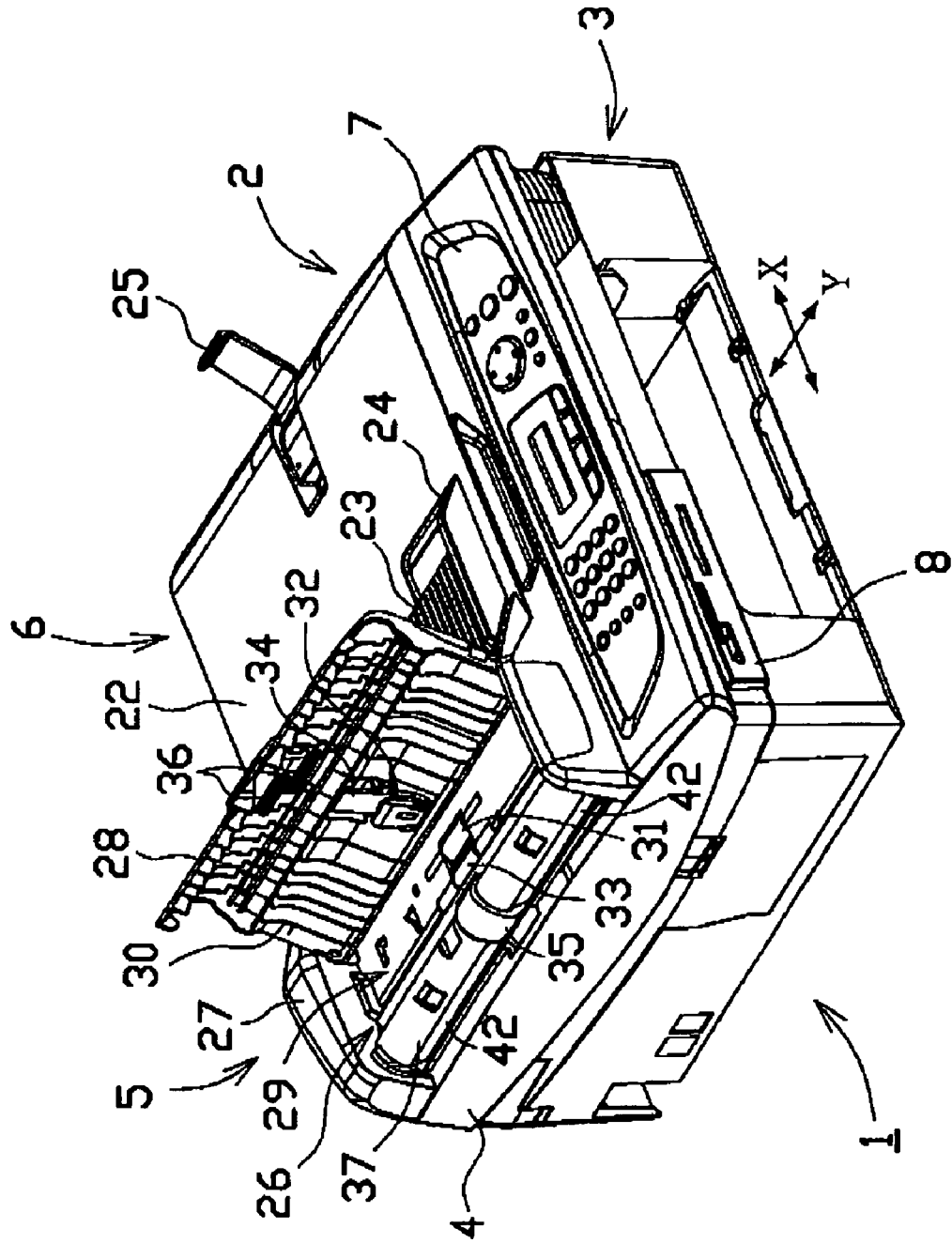
FIG. 2 is a perspective view of the multifunction apparatus, with a cover of an ADF open.

At an end of the sheet feed tray 22 which is opposite to the ADF 5, there is disposed a sheet stopper 25 having a standing position and a folded position. In the standing position, the stopper 25 stands upright from the sheet feed tray 22 or the upper surface of the cover structure 6. In the folded position, the stopper 25 lays low with a surface of the stopper 25 flush with the sheet feed tray 22. For instance, when a document sheet having a size nearly equal to that of the sheet feed tray 22 is ejected from the ADF 5 while the stopper 25 is in its standing position as shown in FIGS. 1 and 2, the ejected document sheet is received by the stopper 25 and does not drop off the sheet feed tray 22. This arrangement enables to reduce an area of the sheet feed tray 22 and accordingly to reduce the size of the sheet pressing cover structure 6 with which the sheet feed tray 22 is integrally formed. When not in use, the stopper 26 is held in its folded position so as not to protrude from the sheet pressing cover structure 6. The multifunction apparatus 1 is thus made compact when stored, or put into a package.

As shown in FIGS. 2 and 3, inside the ADF 5 is formed the feed pathway 26 in a substantially U-like shape, as seen from the front side of the multifunction apparatus 1, extending from the sheet feed tray 22 to the catch tray 23. The feed pathway 26 is defined inside an ADF main body 27 integrally formed with the sheet pressing cover structure 6, and an ADF cover 28 disposed on the ADF main body 27 to be capable of being opened/closed by being turned upward and downward with respect to the ADF main body 27. As shown in FIG. 3, the ADF 5 includes a feed-in chute 29 formed as a passage having some width or vertical dimension by being defined between a horizontal surface extending in the ADF main body 27 continuously from the sheet feed tray 22, and a partition plate 30 disposed inside the ADF cover 28. The feed pathway 26 is formed to be substantially U-shaped, namely, extends from the feed-in chute 29 to an ejecting chute 38 via a curved portion 37. The curved portion 37 and the ejecting chute 38 are also continuously formed as a passage having some width by being defined by members including the ADF main body 27, the ADF cover 28, the partition plate 30, and a guide device constituted by two guide parts 42.

In the feed pathway 26, means for feeding a document sheet is disposed. More specifically, as shown in FIGS. 2-4, the feeding means is constituted by a combination of a feed-in roller 31 and a feed-in nip member 32 in pressing contact with the feed-in roller 31, a combination of a separating roller 33 and a separation nip member 34 in pressing contact with the separating roller 33, and a combination of a feeder roller 35 and a plurality of pinch rollers 36 each in pressing contact with the feeder roller 35. It is noted that the structure of the rollers and nip members is described by way of example only, and the feeding means may be replaced with as any other known means. For instance, the number of the rollers and the positions thereof may be changed, and each nip member may be replaced by a pinch roller.

As shown in FIGS. 2 and 3, the feed-in roller 31 is rotatably disposed about at a center of the feed-in chute 29 in a direction of a width of the document sheet or the front-rear direction of the multifunction apparatus 1 (hereinafter simply referred to as "the width direction"), with a part of an outer circumferential surface of the feed-in roller 31 exposed from a horizontal upper surface of the ADF main body 27. The separating roller 33 is disposed in a similar manner as the feed-in roller 31, at a position spaced from the feed-in roller 31 in the feeding direction. That is, a part of an outer circumferential surface of the separating roller 33 is exposed from the horizontal upper surface of the ADF main body 27, such that the separating roller 33 is rotatable. Although not shown, a driving force of a motor is transmitted to the feed-in roller 31 and the separating roller 33 to rotate these rollers. Although not shown, the feed-in roller 31 and the separating roller 33 have a same diameter, and these rollers 31, 33 are rotated at a same speed. The driving force of the motor is transmitted to the feed-in roller 31 via a single-cycle clutch interposed therebetween so that idle rotation of the feed-in roller 31 is allowed up to a single full turn.

The feed-in nip member 32 is disposed on the partition plate 30 and at a position opposed to the feed-in roller 31, such that the feed-in nip member 32 is displaceable toward and away from the feed-in roller 31. The feed-in nip member 32 is elastically biased downward by a spring member not shown, to be held in pressing contact with the outer circumferential surface of the feed-in roller 31 in a state where a document sheet is not nipped between the feed-in nip member 32 and the feed-in roller 31. Similarly, the separation nip member 34 is disposed on the partition plate 30 and at a position opposed to the separating roller 33, such that the separation nip member 34 is displaceable toward and away from the separating roller 33, and the separation nip member 34 is elastically biased downward by a spring member not shown and held in pressing contact with an outer circumferential surface of the separating roller 33 in a state where a document sheet is not nipped between the separation nip member 34 and the separating roller 33. A document sheet is pressed onto the feed-in and separating rollers 31, 33 by the feed-in and separation nip members 32, 34, and thereby nipped therebetween, so that the torque of the feed-in and separating rollers 31, 33 is transmitted to the document sheet.

The feeder roller 35 is disposed at the curved portion 37 of the substantially U-shaped feed pathway 26. The feeder roller 35 has an outer circumferential surface which partially constitutes the curved portion 37, and thus has a diameter suitable for the curved portion 37. In a similar way as the feed-in roller 31 and separating roller 33, the feeder roller 35 also receives the driving force of the motor not shown, to be thereby rotated.

Around the feeder roller 63, there are disposed three pinch rollers 36 at respective positions. A shaft of each pinch roller 36 is elastically biased by a spring member, and supported by the ADF main body 27 or the ADF cover 28 such that each pinch roller is rotatable and held in pressing contact with the outer circumferential surface of the feeder roller 35. Rotation of the feeder roller 35 rotates each pinch roller 36. The document sheet is pressed onto the feeder roller 35 by the pinch rollers 36 so that the torque of the feeder roller 35 is transmitted to the document sheet.

On the downstream side of the feeder roller 35 in the feeding direction, there is formed the ejection chute 38 by being defined between the ADF cover 28 and the partition plate 30. The ejection chute 38 is continuous from the curved portion 37 defined between an interior surface of the ADF cover 28 and the feeder roller 35. Hence, the document sheet supplied into the feed pathway 26 from the sheet feed tray 22 is sequentially fed through the feed-in chute 29, the curved portion 37 and the ejection chute 38, to be eventually ejected onto the catch tray 23.

The ADF cover 28 is pivotably supported at a position on a side of the feed-in roller 31 near the sheet feed tray 22, as shown in FIG. 2, so that the ADF cover 28 can be opened by being turned upward. When the ADF cover 28 is opened, the feed-in chute 29 and the curved portion 37 are exposed to the outside, and the feed-in roller 31 and the separating roller 33 are respectively separated from the feed-in nip member 32 and separation nip member 34. The ADF cover 28 is opened, when a paper jam occurs in the feed pathway 26 and the jammed paper is to be eliminated, or when a maintenance work for the inside of the ADF 5 is to be implemented.

As shown in FIG. 3, the platen glass 20 is disposed on the upper surface of the reading table 4, and a document sheet is placed on the platen glass 20 when the scanner portion 2 is used as FBS. The platen glass 20 may be a transparent glass plate. The paten glass 20 extends beyond under the feeder roller 30, and accordingly over the reading line corresponding to the reading position 39 at which an image on a document sheet is read when image reading is performed using the ADF 5.

Inside the reading table 4 is incorporated the image reading unit 21, which comprises, as shown in FIG. 3, a CIS unit 40 as a kind of a reading head, a carriage 41, and a scanning mechanism (not shown). The CIS unit 40 is a close-contact type image sensor which emits light onto a document sheet and receives the reflected light which is converted into an electrical signal. The CIS unit 40 is opposed to the feeder roller 35. An axial direction of the feeder roller 35, that is, the width direction of the document sheet is a direction of reading or scanning by the CIS unit 40. Mounted on the carriage 41, the CIS unit 40 is held in close contact with the platen glass 20. For performing scanning, the carriage 41 is moved widthwise under the platen glass 20, by the scanning mechanism not shown. When the scanner portion 2 is used as FBS, the carriage 41 is moved widthwise under the platen glass 20 so that the CIS head 40 reads an image on a document sheet placed on the platen glass 20. On the other hand, when the ADF 5 is used in reading an image, the carriage 41 is moved to the reading position 39 and kept there at rest, as shown in FIGS. 3 and 4, so as to read the image on the document sheet as passing the reading position 39.

In the present embodiment, the scanner portion 2 serves as an FIBS also. Hence, the image reading unit 21 is adapted to be able to scan by moving along the surface of the platen glass 20. However, the function of FBS is an optional, and where the invention is embodied as an image reading apparatus for reading images using only the ADF 5, the image reading unit 21 is stationary and the scanning mechanism is omitted. Although in this embodiment the CIS unit 40 of close-contact type is used for the image reading unit 21, a CCD head of a miniaturized optical system or other known reading heads may be used for the image reading unit 21, in place of the CIS unit 40.

Figure 5:
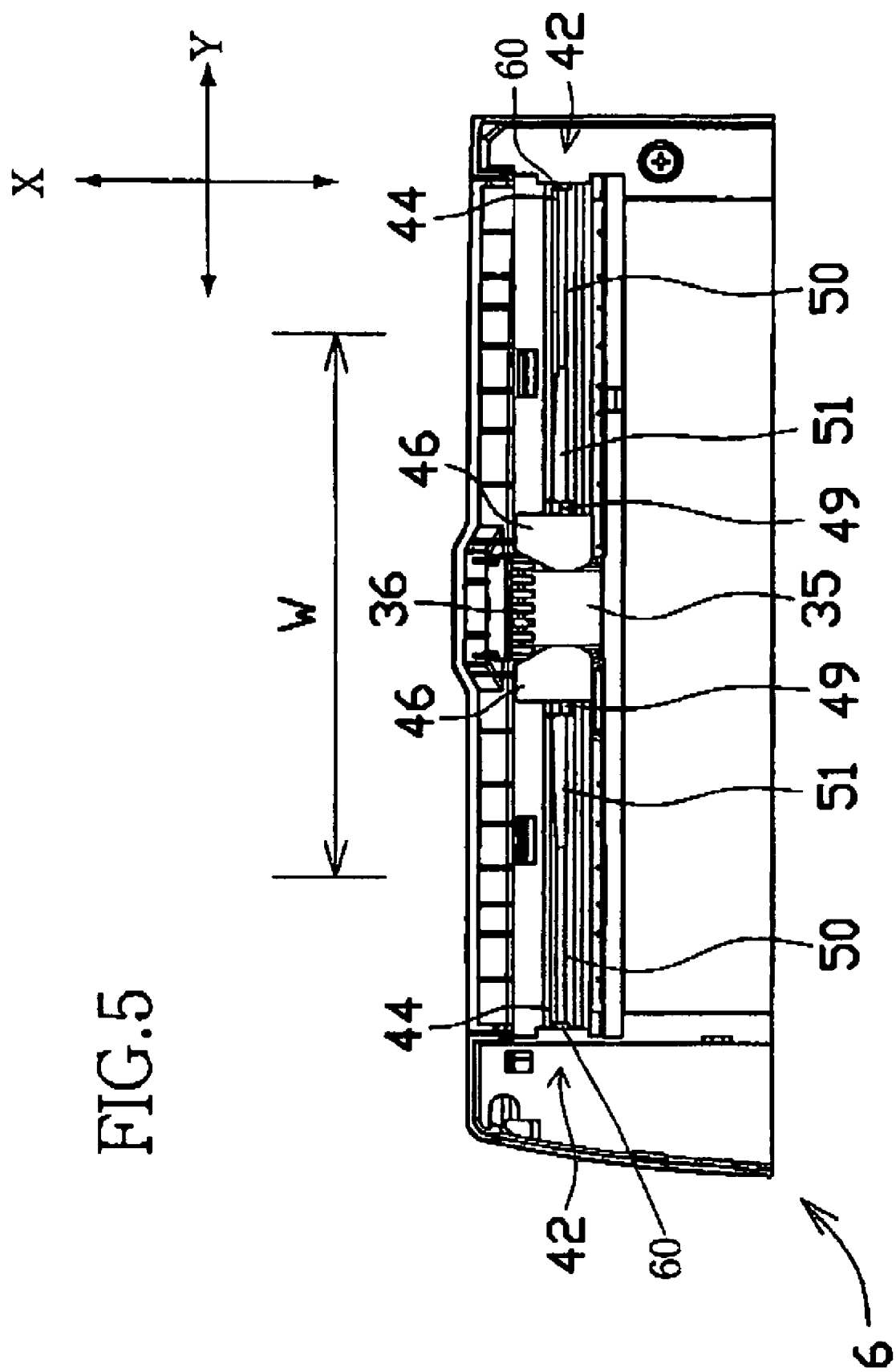
FIG. 5 is a bottom view of a portion of a sheet pressing cover which is opposed to a reading line present in an upper surface of a platen glass of a reading table in a scanner portion of the multifunction apparatus.

The pair of guide parts 42 constituting the guide device are disposed at the reading position 39 in an inner guide surface of the curved portion 37 of the feed pathway 26. The guide device is for guiding to the reading position 39 the document sheet as fed along the feed pathway 26, and the guide parts 42 constituting the guide device are disposed on the opposite sides of the feeder roller 35, respectively, as shown in FIGS. 2 and 5. That is, the feeder roller 35 is disposed at a position corresponding to the reading position 39 and substantially at a center in the width direction, with the two guide parts 42 disposed on the opposite sides of the feeder roller 35 in the width direction.

Each of the guide parts 42 comprises a suspending portion 43 attached to a driving shaft of the feeder roller 35, and a guiding portion 44 providing the guide surface of the feed pathway 26, as shown in FIG. 4. The suspending portions 43 of the respective guide parts 42 holds the driving shaft of the feeder roller 35 on the two opposite sides thereof. The feeder roller 35 and the reading unit 21 are opposed to each other at the reading position such that an axis of the driving shaft of the feeder roller 35 and a longitudinal centerline of the reading surface of the reading unit 21 coincide in plan view. The guiding portion 44 has a downwardly convex circular shape whose outer surface constitutes the inner guide surface of the curved portion 37. Hereinafter, the word "guide part 42" may refer to the guiding portion 44 in effect.

As shown in FIG. 5, a part of the feeder roller 35 and a part of each of the guide parts 42 are exposed to an under side of the sheet pressing cover structure 6, at the reading position 39. The outer circumferential surface of the feeder roller 35, and an outer circular surface of each of the guide parts 42 which constitutes the guide surface have a substantially same color. The outer circumferential surface of the feeder roller 35 is formed of a synthetic resin such as EPDM (Ethylene Propylene Diene Methilene Linkage), while the guide parts 42 are made of a synthetic resin such as ABS (Acrylonitrile Butadisne Styrene). The colors of these resin materials are substantially the same, or alternatively, the feeder roller 35 and the guide parts 42 are painted in a substantially same color. Although the substantially same color is not necessarily limited to a particular color, white is preferably employed in view of the following. That is, the document sheet is usually white, and the reading unit reads the image on the document sheet across a full width of the reading position or a maximum width possible to read for the reading unit. Thus, where an image on a document sheet having a width relatively small is read by the reading unit, and the read image is outputted onto a recording sheet of a size different from that of the document sheet and having a larger width than the document sheet, two opposite lateral portions of the image recorded on the recording sheet on the outer side of the width of the scanned document sheet, that is, lateral margins of the recorded image, are dark or suffer from an undesirably high density, unless lateral portions of the guide parts which are exposed to the reading surface of the reading unit 21 on the outer side of the width of the document sheet are white like the document sheet. In other words, by having the guide parts and the feeder roller white, it is prevented that the margins of the outputted image are dark.

Figure 6:
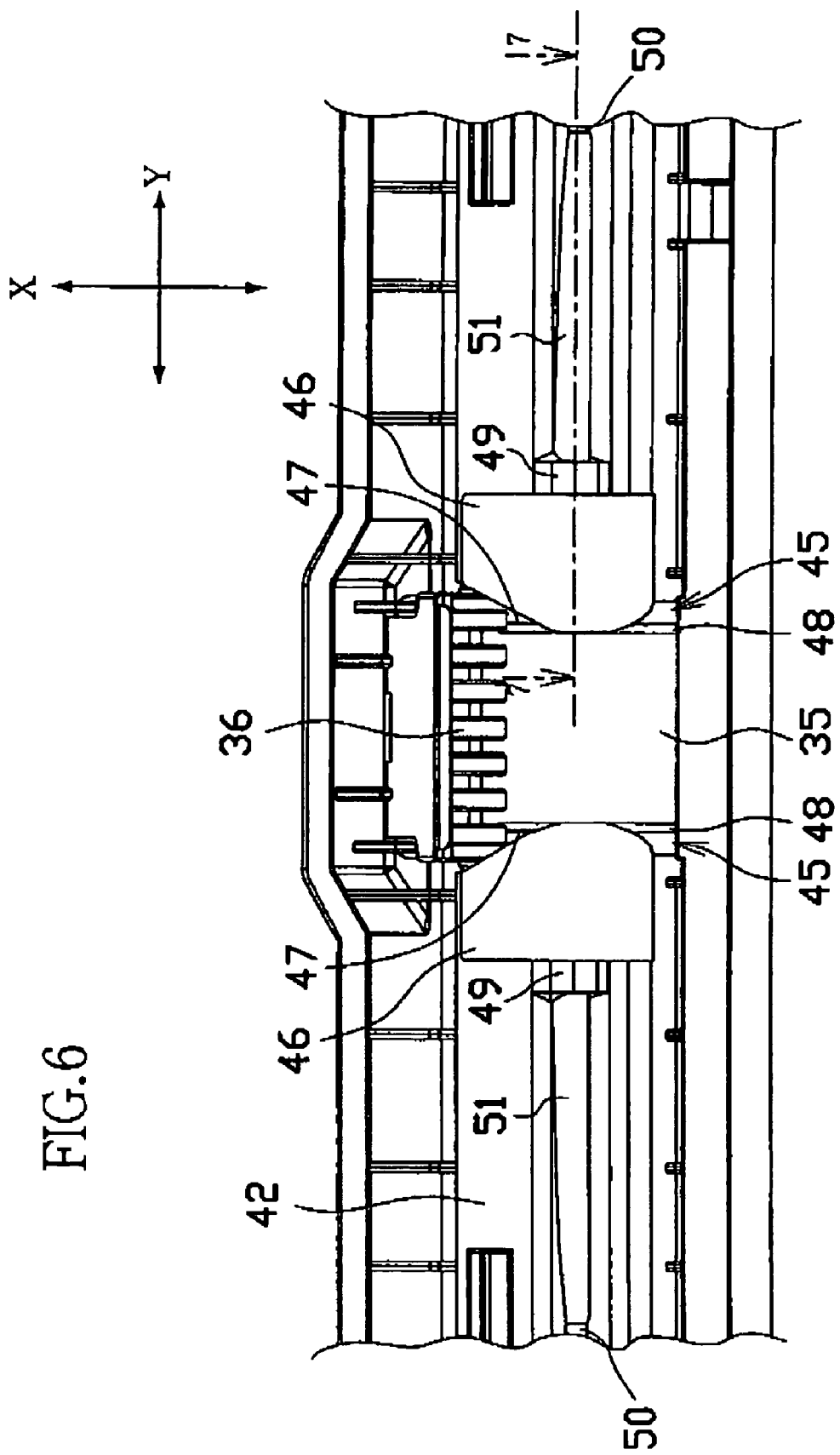
FIG. 6 is an enlarged view of the opposed portion shown in FIG. 6.

As shown in FIG. 6, there is a clearance 45 between the feeder roller 35 and each of the guide parts 42. As described above, to support the driving shaft of the feeder roller 35 by the suspending portions 43 of the guide parts 42 such that the feeder roller 35 is rotatable, a suitable amount of play is required in the axial direction, and thermal deformation of each member and design tolerance thereof should also be taken into consideration. Thus, there is left the clearance 45 between each of the guide parts 42 and the feeder roller 85, and a film material 46 is attached to the guide surface of each guide part 42 to cover each clearance 45.

The film material 46 is made of an elastically deformable synthetic resin such as PET (Polyethylene Terephthalate). The film material 46 has a width (i.e., a dimension in a direction perpendicular to the width direction of the document sheet) at least corresponding to that of the reading line in the upper surface of the platen glass 20, which positionally corresponds to the reading position 39. The length of the film material 46 is such that the film material 46 extends beyond an end of the guide part 42 on the central side in the direction of a rotation axis of the feeder roller 35, to reach the outer circumferential surface of the feeder roller 35. The film material 46 also has the substantially same color as the outer circumferential surface of the feeder roller 35 and the guide surfaces of the guide parts 42, that is, the outer circumferential surface of the feeder roller 35, the guide parts 42, 42, and the film materials 46, 46 have a substantially same color. It is noted that, for some reason or other, to make the color of the film materials 46, 46 completely identical with that of the outer circumferential surface of the feeder roller 35 and the guide parts 42, 42 adversely causes a difference in density in the read image, in some situations. In such a case, the colors of these members are slightly differentiated on purpose, so as to resolve the density difference. Thus, it is not necessarily essential that the color of the film materials 46, 46 is completely identical with that of the outer circumferential surface of the feeder roller 35 and the guide parts 42, 42, but it suffices that the color of the film material 46 is the same as, or similar to, that of the outer circumferential surface of the feeder roller 35 and the guide surfaces of the guide parts 42 to a degree to allow the difference necessitated as described above. In the case where a single film material is employed in place of the two film materials 46, 46, as mentioned at the last of this specification, it is more often the case that the film material has the color which is identical with that the outer circumferential surface of the feeder roller 35 and the guide parts 42, 42 have, compared to the case where the two film materials 46, 46 are employed.

Meanwhile, the feeder roller 35 has, at each of two opposite ends thereof, a restricting member 47 having an external diameter slightly smaller than that of the feeder roller 35. The restricting member 47 is an annular disc member for restraining rotational displacement of the outer circumferential surface of the roller body relative to the driving shaft of the feeder roller 35 due to an elastic deformation of the roller body in a circumferential direction of the roller body. An outer circumferential surface of each of the restricting members 47 constitutes a stepped portion 48 which is located at one of two opposite ends of the outer circumferential surface of the feeder roller 35 and whose diameter is smaller than that of the feeder roller 35. An end of the film material 46 extends to reach the stepped portion 48 or the restricting member 47, and is held in contact with and supported by the outer circumferential surface of the stepped portion 48 or the restricting member 47. The film material 46 disposed as described above covers the clearance 45 between the feeder roller 35 and the guide part 42, against the reading surface.

The external diameter of the restricting member 47 is determined to satisfy the following conditions. First, the diameter of the restricting member 47 should be smaller than the external diameter of the roller body so that the restricting member 47 does not inhibit the feeding of the document sheet. Second, the difference in the external diameter between the restricting member 47 and the roller body is sufficient so that in a case where the restricting member is fixed to the roller body by bonding with an adhesive, the adhesive running over does not cause any problem. Third, since the restricting member supports the film material 46 with the outer circumferential surface of the restricting member in contact with the film material 46, the diameter of the restricting member 47 is such that the film material 45 is not excessively spaced from the reading line in the upper surface of the platen glass 20.

The restricting member 47 is a thin plate member of synthetic resin, which is concentric with the roller body as a main body of the feeder roller 35 and has the external diameter smaller than that of the roller body, as described above. At each of the two opposite axial end faces of the roller body, the restricting member 47 is fixed by bonding with a liquid or solid adhesive, with an internal circumferential surface of the restricting member 47 fitted on the driving shaft of the feeder roller 35, for instance. In the present embodiment, the restricting member 47 is formed in an annular shape having an internal diameter substantially equal to an external diameter of the driving shaft of the feeder roller 35, and the external diameter slightly smaller than that of the roller body. However, the shape of the restricting member 47 is not limited to this, and the way of firing the restricting member 47 is not limited to bonding. For instance, the restricting member 47 may be fixed to the roller body with a double-sided adhesive tape. Although in the present embodiment the restricting members 47 are attached to the feeder roller 35 by only being bonded to the opposite axial end faces of the feeder roller 35, each restricting member 47 may be fixed to the driving shaft of the feeder roller 35, and may not be merely fitted on the driving shaft.

The restricting member 47 also has the substantially same color as the outer circumferential surface of the feeder roller 35, the guide surfaces of the guide parts 42, and the film materials 46. That is, the outer circumferential surface of the feeder roller 35, the guide parts 42, 42, the film materials 46, 46, and the restricting members 47, 47 have a substantially same color.

It is noted that in the present invention the words "a substantially same color" or the like means that the colors in question are completely identical or similar to a degree such that when an image on a document sheet, whose thickness is the smallest among document sheets to be read by the scanner portion 2, is read, the read image is not adversely affected by the color difference.

As long as the dimensional accuracy of the roller body is not deteriorated, the restricting members 47 may be embedded into the roller body.

Figure 7:
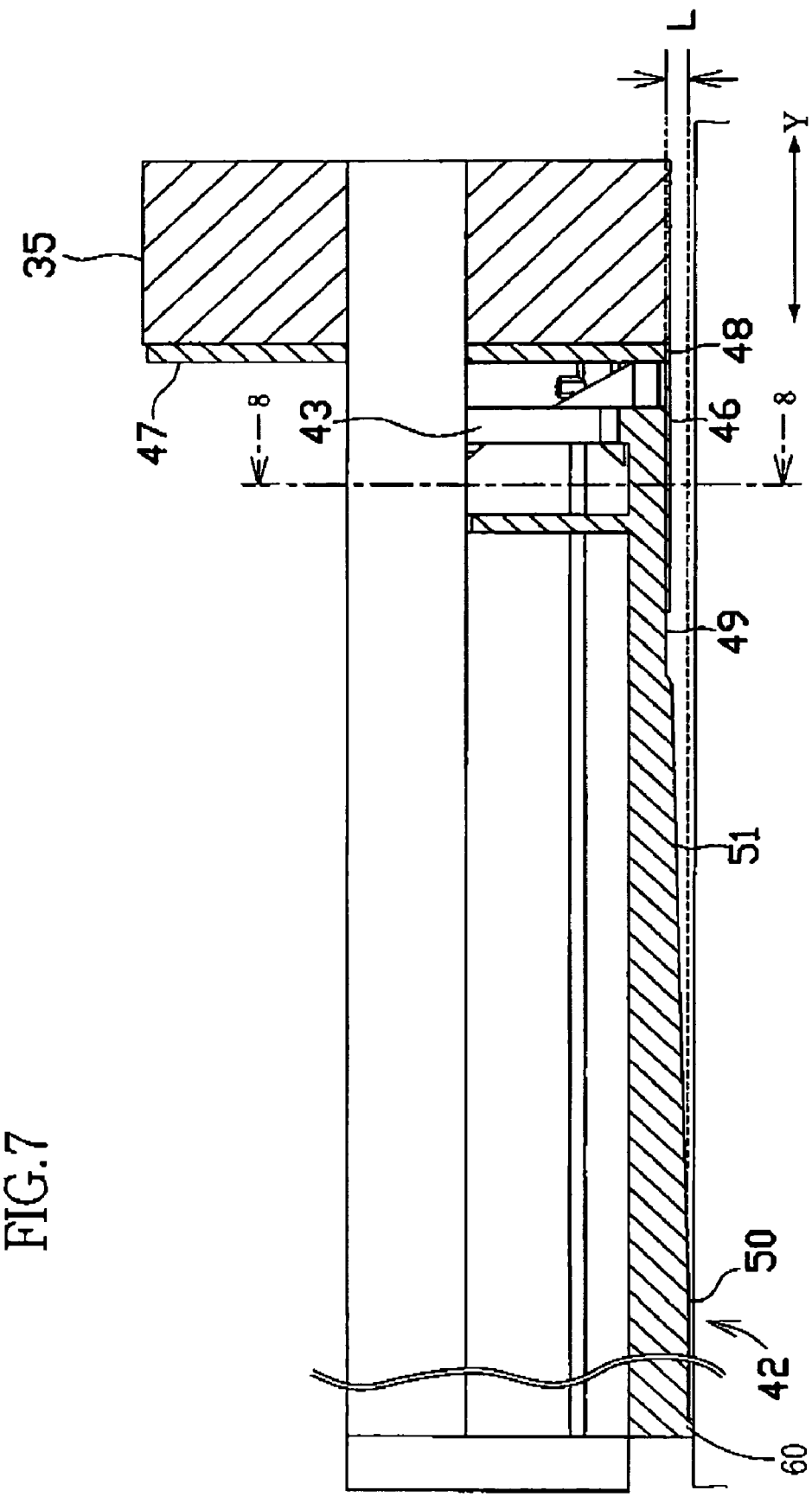
FIG. 7 is a cross-sectional view taken along line 7-7 in FIG. 6.
Figure 8:
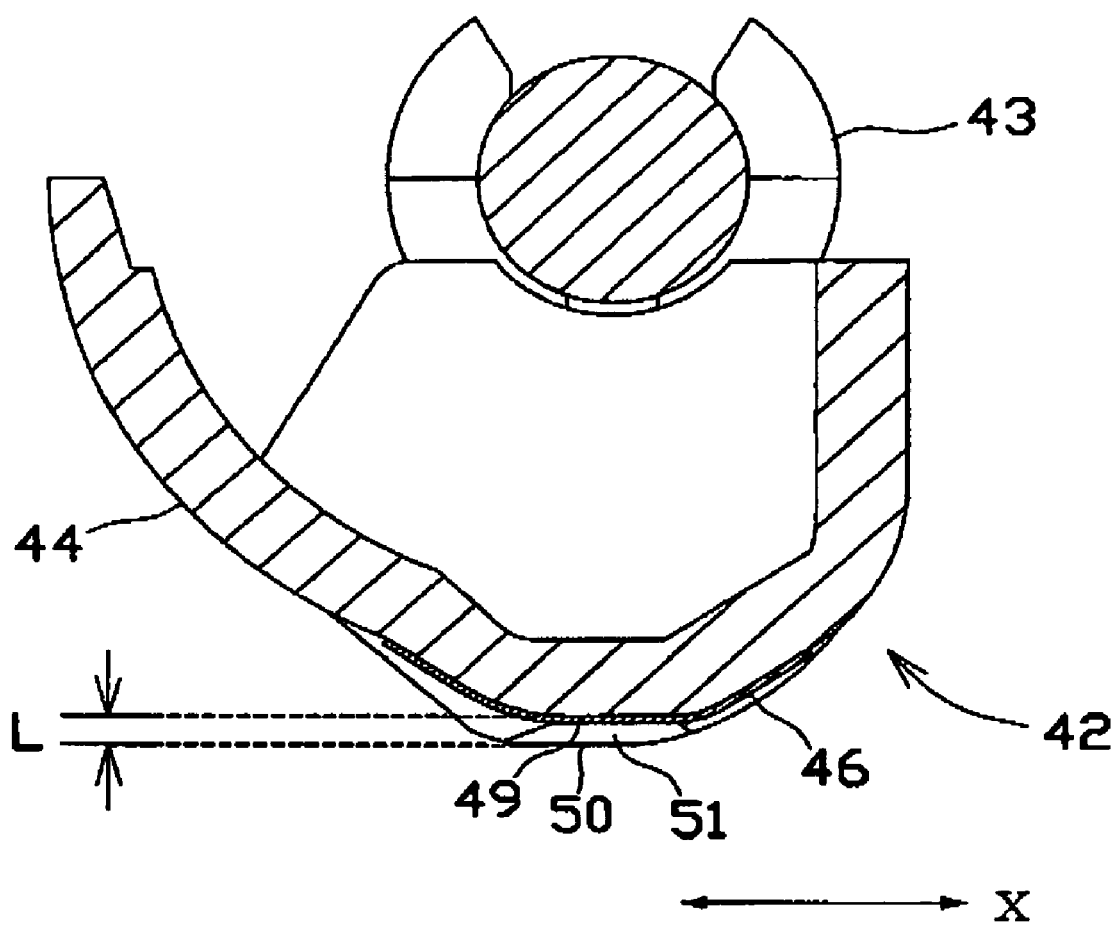
FIG. 8 is a cross-sectional view taken along line 8-8 in FIG. 7.

As apparent from the above description, in the present embodiment the feed-in roller 31 and the separating roller 33 constitute a first driving roller, and the feeder roller 35 constitutes a second driving roller, At the end of each guide part 42 on the axially central side, there is formed a recessed portion 49 which is a sunken portion in the guide surface. More specifically, as shown in FIGS. 7 and 8, an opposed portion, which is opposed to the reading line and accordingly the reading surface of the reading unit 21, in the guide surface of each guide part 42 is plane and generally parallel to the upper surface of the platen glass 20. As guided by this opposed portion of the guide surface (hereinafter simply referred to as "the opposed portion"), the document sheet is fed in close contact with the upper surface of the platen glass 20 at the reading line. The opposed portion of the guide surface in each guide part 42 includes a parallel portion 50 at an end of the opposed portion remote from the feeder roller 35. The parallel portion 50 is substantially horizontal and parallel to the reading surface of the reading unit 21 and contacts the document sheet. On an axially outer side of each parallel portion, there is an abutting portion 60 as shown in FIGS. 5 and 7. Each guide part 42 is positioned in level or height with respect to the upper surface of the platen glass 20 by contact of the abutting portions 60, 60 with the upper surface of the platen glass 20.

Meanwhile, at the other end of the opposed portion on the axially central side or an end of the opposed portion adjacent to the feeder roller 35, there is formed the recessed portion 49 where the guide surface is sunken by a depth L in a direction away from the reading line in the upper surface of the platen glass 20. The recessed portion 49 provides a space in which the film material 46 is disposed, and thus the dimensions of the space is determined depending on the dimensions of the film material 46. The depth L of the recessed portion 49 is determined depending on the thickness of the film material 46, such that when the film material 46 is fixed to the recessed portion 49, a surface of the film material 46 is located inward, in the radial direction of the guide part 42, of the parallel portion 50 of the guide surface, by some amount. The thickness of the film material 46 is determined depending on a material employed, and in view of the required degree of durability and flexibility, An inclined portion 51 is formed between the recessed portion 49 and the parallel portion 50 in the guide surface. More specifically, as shown in FIG. 7, the opposed portion in the guide surface constituted by a lower surface of the guide part 42, is gradually inclined inward, in a tapered manner away from the upper surface of the platen glass 20 and in an axial direction from the parallel portion 50 to the recessed portion 49 where the depth of the sinking or the amount of inclination becomes L. Thus, in the cross-sectional view of FIG. 7 taken along the width direction, the distance between the guide surface and the reading line in the upper surface of the platen glass 20 varies at the inclined portion 51. A dimension of the inclined portion 51 in the axial direction of the feeder roller is determined in view of a width W, as shown in FIG. 5, of a document sheet having a minimum width among all document sheets of various sizes that the image reading unit 21 is designed to deal with, namely, read an image using the ADF 5 of the scanner portion 2. The ADF 5 is of central registration type where the center of the ADF in the width direction serves as a reference point in feeding a document sheet. As shown in FIG. 6, each inclined portion 51 is within a range of the minimum width W, with the center of the minimum width W being the reference point.

In other words, an entirety of a part of the opposed portion of the guide surface of each guide part 42 which is outside the inclined portion 51 and parallel to the platen glass 20, constitutes the parallel portion 50. From a point inside the minimum width W, the opposed portion of the guide surface in the guide part 42 is gradually inclined radially and axially inward from the parallel portion 50 so as to form the inclined portion 51, and in the vicinity of the feeder roller 35, the depth eventually becomes L to form the recessed portion 49.

There will be now described how an image on a document sheet is read using the ADF 5.

To read an image by the scanner portion 2 using the ADF 5, the sheet pressing cover structure 6 is closed with respect to the reading table 4, as shown in FIG. 1. The document sheet an image on which is to be read is placed on the sheet feed tray 22. One or more document sheet(s) may be placed on the sheet feed tray 22. In a case where images on a plurality of document sheets of a same size are to be read, the document sheets are first stacked and trued up, and one end of the stack of the document sheets is inserted into the feed-in chute 29 from the side of the sheet feed tray 22.

The stack of the document sheets as inserted into the feed-in chute 29 is first brought into contact with the feed-in nip member 32. Since the feed-in roller 31 is allowed for idle rotation by a single turn as described above, the feed-in roller 31 is rotated in contact with the inserted stack, and the feed-in nip member 32 is retracted against the biasing force of the spring member as the stack is further inserted inward. The inserted end of the stack then contacts the separating roller 38 and separation nip member 34. This contact gives the user feeling of resistance, making the user recognize that the stack of the document sheets is completely inserted. When the stack of the document sheets is placed on the sheet feed tray 22 with its one end inserted in the feed-in chute 29, setting of the document sheets is complete.

Then the user manipulates the operator panel 7 to instruct the multifunction apparatus 1 to initiate reading the images on the document sheets. For instance, the operator panel 7 has a start button and the user can instruct the multifunction apparatus 1 to initiate the reading by pressing the start button. Inputted with the instruction, a control portion (not shown) of the multifunction apparatus 1 drives the motor to rotate the feed-in roller 31, separating roller 33, and feeder roller 35 at respective timings predetermined. The carriage 41 is displaced to locate the CIS unit 40 at the reading position 39 or under the reading line in the upper surface of the platen glass 20. The CIS 40 has a light source from which light is emitted to perform calibration with respect to the chromaticity and luminance, by using the guide surface of the guide parts 42 as the reference portion.

With rotation of the feed-in roller 31, the document sheet pressed onto the feed-in roller 31 by the biasing force of the feed-in nip member 32 is transported in the feeding direction. The plurality of document sheets stacked are together biased by the feed-in nip member 32 toward the feed-in roller 31, and the lowermost one of the stack of the document sheets which contacts the outer circumferential surface of the feed-in roller 31 receives the torque of the feed-in roller 31 to be fed in the feeding direction. Thus, the end of the document sheet enters between the separating roller 33 and the separation nip member 34 to be nipped therebetween. The document sheet is pressed onto the outer circumferential surface of the separating roller 33 by the separation nip member 34, and receives the torque of the separating roller 33 to be further transported in the feeding direction. When the lowermost one of the document sheets is sent out by the feed-in roller 31, another or other several sheets on the lowermost sheet may be together sent out, for instance because of the static electricity or other reasons. However, even where a plurality of document sheets enter between the separating roller 33 and the separation nip member 34, only the lowermost sheet directly receives the torque of the feed-in roller 31 and the separating roller 33, and thus the lowermost sheet is separated from the other sheet or sheets and solely sent into the feed pathway 26.

The document sheet thus supplied is guided by the feed pathway 26 and transported downward, toward the reading position 39. That is, the document sheet is nipped between the feeder roller 35 and one of the three pinch rollers 36 which is immediately downstream of the separating roller 35, and receives the torque of the feeder roller 35 to be fed to the reading position 39. While the document sheet is in the feed pathway 26 and until a front end of the document sheet reaches the reading position 39, a lead sensor (not shown) keep detecting the front end of the document sheet, and it is determined whether the front end has reached the reading position 39 based on an output value, or the number of steps, of an encoder for the motor which drives the feeder roller 35. Once it is determined that the front end has reached the reading position 39, the CIS unit 40 initiates reading the image on the document sheet passing the reading position 39.

While the image being read by the CIS unit 40, the document sheet is farther fed, and there comes to be established a state where the document sheet receives the torque of the feeder roller 35 with the front end of the document sheet nipped between the feeder roller 35 and another of the three pinch rollers 36 which is immediately downstream of the reading position 89, while a rear end portion of the document sheet is nipped between the feeder roller 35 and the inch roller 36 immediately upstream of the reading position 39. Being fed in this state, the document sheet is reversed along the curved portion 37. During the feeding of the document sheet in such a way, the CIS unit 40 keeps reading the image on the document sheet passing the reading position 39. The lead sensor detects the rear end of the document sheet, and it is determined whether the rear end has reached the reading position 39 based on the output value, or the number of steps, of the encoder for the motor driving the feeder roller 35. Once the rear end has reached the reading position 39, the CIS unit 40 terminates reading the image, and the document sheet is ejected onto the catch tray 23 via the ejection chute 38.

In this way, the image on the document sheet as passing the reading position 39 is read by the CIS unit 40, and as shown in FIG. 4, the guide parts 42 constituting the guide device are disposed in the curved portion 37 and at the position opposed to the reading position 39. Thus, the document sheet the image whereon is to be read is guided by the guide parts 42, to reach the reading position 39. As shown in FIGS. 5 to 8, at the end portion of each guide part 42 on the axially central side is formed the recessed portion 49, and there is formed the inclined portion 51 which is inclined toward the recessed portion 49 in the tapered manner. At the recessed portion 49 and the inclined portion 51, the lower surface of the guide part 42 is sunken in a direction away from the upper surface of the platen glass 20, with respect to the parallel portion 50 for guiding the document sheet while holding the document sheet in close contact with the reading line in the upper surface of the platen glass 20. The recessed portion 49 and the inclined portion 51 are formed inside the minimum width W, and therefore the document sheet is fed with opposite end portions thereof held in close contact with the platen glass 20 by the parallel portion 50, in any situation. Accordingly, a clearance is never formed between each of the two widthwise opposite end portions of the document sheet and the platen glass 20. In the vicinity of an end of the opposed portion of the guide surface of each guide part 42, which correspond to one of the ends of the document sheet in its width direction, and at which the document sheet is not present when the document sheet passes the reading position 39, the parallel portion 50 is opposed to the reading line in the upper surface of the platen glass 20, thereby preventing the read image from being dark in two opposite end portions of the document sheet in its width direction.

To read the image, the CIS unit 40 emits light onto the document sheet as passing the reading position 39, and receives the light as reflected by the document sheet. When the document sheet is thin, the light from the CIS unit 40 is partially transmitted therethrough. The feeder roller 35 is disposed at the center in the width direction and opposed to the reading position 39, as shown in FIG. 6, and the guide parts 42 are disposed on the axially opposite sides of the feeder roller 35. The light transmitted through the document sheet is reflected by the outer circumferential surface of the feeder roller 35 at the central portion in the width direction, and by the opposed portions in the guide surfaces of the guide parts 42 at both of the opposite sides of the central portion in the width direction. As described above, the outer circumferential surface of the feeder roller 35 and the guide surfaces of the guide parts 42 have a substantially same color, the reflectance of these members 35, 42 are about the same. Accordingly, a density difference in the read image due to a reflectance difference among these members 35, 42 does not occur.

As shown in FIG. 6, there is the clearance 45 between the feeder roller 35 and each of the guide parts 42. If there were not the film material 46, the light transmitted through the document sheet would enter the inside of the ADF 5 through the clearance 45, and thus the light would not be reflected at the place corresponding to the clearance 45, meaning that the light would not return to the CIS unit 40 from the place corresponding to the clearance 45. On the other hand, the feeder roller 35 and the guide parts 42 do reflect the light. This difference would lead to the density difference in the read image in the case where the film material 46 is not provided. According to the embodiment, however, the film material 46 covers the clearance 45, and thus the light transmitted through the document sheet and reaching the place corresponding to the clearance 45 is incident on and reflected by the film material 46, and the reflected light returns to the CIS unit 40. By this arrangement, the density difference, or the show-through, due to the clearances 46 is prevented.

The film material 46 is attached to the guide surface of each guide part 42, and extends to overlap the outer circumferential surface of the restricting member 47 fixed to a side face of the feeder roller 35, as shown in FIGS. 7 and 8, thereby covering the clearance 45 completely and reliably. By employing the thin film material 46 as a member for covering the clearance 45, the clearance 45 between the feeder roller 35 and the guide part 42 can be covered while the guiding of the document sheet by the guide device is not affected by the presence of the film material 46. With a suitable degree of flexibility, the film material 46 can deflect or deform, according to a slight change in the dimension of the clearance 45 due to thermal deformation of relevant components, or a dimensional error of the feeder roller 35 and the guide parts 42, so as to keep covering the clearance 45 with high reliability.

In this way, at each of the two axially opposite ends of the outer circumferential surface of the feeder roller 35, there is formed the stepped portion 48 provided by the outer circumferential surface of the restricting member 47, by which the end of the film material 46 is supported. Accordingly, the end of the film material 46 does not deflect inward, or drop to the inside, even where the end of the film material 46 is pushed inward by the document sheet or others.

Although in the present embodiment a cover for covering the clearance 4 is provided by the film material 46 which is a flexible member, this is not essential. For instance, the guide part 42 may be configured such that the guide surface further axially extends or protrudes at the end of the guide part 42 on the axially central side, to thereby constitute the cover. However, in view of contact of the cover with the feeder roller 35, as well as replacement work necessitated by wear and breakage of the cover, it is preferable that a separate member such as the above-described film material 46 is fixed to the guide part 42.

By fixing the film material 46 to the guide part 42, a raise having a height corresponding to the thickness of the film material 46 is formed on the guide surface of the guide part 42. However, as shown in FIGS. 7 and 8, there is formed the recessed portion 49 at the place where the film material 46 is fixed to the guide part, that is, the end of the guide part 42 on the axially central side, and the depth L of the recessed portion 49 is sufficiently larger than the thickness of the film material 46. Hence, the surface of the film material 46 is located radially inward of the parallel portion 50 for guiding the document sheet in close contact with the reading line in an upper surface of the platen glass 20. The parallel portions 50 hold the opposite ends of the document sheet in close contact with the reading line or the platen glass 20, and the widthwise central portion of the document sheet is located at the substantially same vertical level as the parallel portions 50 due to tension of the document sheet itself, and held in close contact with the reading line in the platen glass 20. Since the feeder roller 35 is located at a position corresponding to the axially central portion of the document sheet, the axially central portion of the document sheet is necessarily located nearer the reading line in the platen glass 20 than the film material 46 supported by the stepped portion 48. Therefore, the document sheet guided by the guide parts 42 is kept spaced from the film material 46 so as not to contact the film material 46. Accordingly, there are prevented failure in feeding the document sheet and damage of the film material 46, which may be otherwise caused by catching of the document sheet by or around the film material 46.

Without contact between the backside of the document sheet and the film material 46, the density difference in the read image caused by the color difference between the film material 46 and the guide parts 42 is reduced. In general, the farther a member is separated from the backside of the document sheet, the less the influence of the color of the member on the read image is. Hence, by suitably determining the depth L of the recessed portion 49 depending on the color difference between the film material 46 and the guide parts 42, the influence of the color of the film material 46 on the read image can be adjusted.

It is preferable that there is no color difference between the film material 46 and the guide device. However, according to the embodiment, even where there is some color difference, there is increased the degree of freedom in selecting the material and color of the film material 46 and the guide device in view of the required cost, within a range that the color difference is adjustable by setting of the depth L of the recessed portion 49. Further, the selectable range of the thickness of the film material 46 is also widened, making it possible to have the film material 46 in a relatively large thickness, depending on the required mechanical strength of the film material 46.

The depth L which is a difference in level between the recessed portion 49 and the parallel portion 50 gradually varies in a tapered manner at the inclined portion 51, as shown in FIGS. 6 and 7. That is, at a boundary between the recessed portion 49 and the parallel portion 50, the distance of the guide part 42 from the backside of the document sheet changes by an amount corresponding to the depth L, such that the distance gradually changes at the inclined portion 51 formed between the recessed portion 49 and the parallel portion 50, and not abruptly. The light reflected at the film material 46 fixed at the recessed portion 49 and the light reflected at the parallel portion 50 are different in a slight degree depending on the depth L of the recessed portion 49 and the color of the film material 46. However, such a difference in the reflected light does not abruptly occurs, but the reflected light gradually varies in accordance with the variation in the distance between the opposed portion of the guide surface and the backside of the document sheet at the inclined portion 51. Accordingly, in the read image, the density difference due to the difference in the reflected light at the boundary between the recessed portion 49 and the guide surface is gradual. Thus, the influence of the difference in the reflected light on the read image is lowered The inclined portion 51 is formed within a range across which the document sheet having the minimum width W passes under the guide surface. By this arrangement, at least both widthwise opposite ends of the document sheet having the minimum width W is guided to the predetermined position by the parallel portions 50, thereby preventing formation of a clearance between the reading line in the upper surface of the platen glass 20 and the widthwise opposite ends of the document sheet, and the parallel portions 50 corresponding to the opposite ends of the document sheet are kept at a predetermined distance from the reading line in the upper surface of the platen glass 20. Hence, it is prevented that end portions, in the width direction, of the read image are dark.

ID the document sheet is imparted a tensile force to pull the document sheet toward the upstream side in the feeding direction, in other words, a strong force to pull the document sheet backward, by the elastic nipping of the document sheet between the separating roller 33 and the separation nip member 34, and between the roller body of the feeder roller 35 and each of the pinch rollers 36. Meanwhile, a force acts on the outer circumferential surface of the roller body of the feeder roller 35 in pressing contact with the document sheet, to cause the elastic deformation of the roller body in the circumferential direction of the roller body toward the upstream side in the feeding direction. However, in the presence of the restricting members 47 attached to the opposite axial end faces of the roller body, the elastic material forming the roller body is restrained from deforming in the circumferential direction. Hence, actually only an outermost portion of the roller body in a small thickness, where the deformation is not restrained by the restricting members 47, is freely deformable, thereby restraining the circumferential elastic deformation of the roller body as a whole. Accordingly, even where a document sheet with an image in color thereon is subjected to reading by the reading unit 21 while being fed, and the feeding is suspended when the document sheet is at the reading position 39, the phenomenon that the circumferential elastic deformation is eliminated during the suspension does not occur, thereby preventing the irregularity in feeding the document sheet and enabling accurate feeding of the document sheet.

In the present embodiment, the restricting member 47 is a thin plate member concentric with the roller body and having an external diameter smaller than that of the roller body, and secured to each of the axially opposite end faces of the roller body. Hence, the restricting members 47 restrain the circumferential elastic deformation of the roller body from the axially opposite sides of the roller body, enhancing the degree of restraining the circumferential elastic deformation of the roller body. Since the outer circumferential surface of the restricting member 47 is concentric with the outer circumferential surface of the roller body, a force to restrain the elastic deformation of the roller body is exerted uniformly in the circumferential direction of the roller body.

The restricting member 47 is an annular disc member having an internal diameter equal to the external diameter of the driving shaft of the feeder roller 35, and can be fitted in alignment with the outer circumference of the driving shaft. This facilitates the positioning of the restricting member 47 on the end face of the roller body.

Since the outer circumferential surface of the restricting member 47 is located near the outer circumferential surface of the roller body, the portion capable of freely elastically deforming in the circumferential direction without restraint by the restricting member 47 is relatively small, enhancing the effect of restraining the circumferential elastic deformation by the restricting member 47.

Bonded to the roller body, the restricting member 47 is firmly fixed to the roller body, thereby enhancing the degree of restraining the circumferential elastic deformation of the roller body.

In the embodiment, the feed pathway 26 is substantially U-shaped and having a first portion at which the feeding direction of the document sheet is a first direction and a second portion at which the feeding direction is a second direction opposite to the first direction, and the document sheet having been fed by an upstream feeding portion having the feed-in roller 31 and the separating roller 33 along the first portion of the feed pathway 26 is reversed by a downstream feeding portion having the feeder roller 35 as a second driving roller, and fed into the second portion of the feed pathway 26. The feeder roller 35 as the second driving roller is disposed with the outer circumferential surface thereof opposed to the reading line in the platen glass 20, and with the rotation axis of the feeder roller 35 coincident with a center of the reversing of the document sheet at the curved portion 37 between the first and second portions of the feed pathway 26. A radius of the outer circumferential surface of the roller body of the feeder roller 35 is equal to a curvature radius of the document sheet at the curved portion 37.

Hence, the shape of the curved portion 37 in the feed pathway 26 is constituted by the outer circumferential surface of the feeder roller 35 as a second driving roller. In other words, a reversing feed pathway can be constituted merely by providing at least one feeder roller 35 on an axis of the reversing of the document sheet at the curved portion 37, and thus the ADF 5 is simplified in structure, reducing the cost of the multifunction apparatus 1.

The guide device constituted by two guide parts 42 temporarily separates the document sheet from the outer circumferential surface of the feeder roller 35 and regulates the motion of the document sheet at the reading position 39. The film material 46 as an exposure preventer or cover prevents the clearance between the guide device and the feeder roller from being exposed to the image reading unit 21. Accordingly, even where the thickness of the document sheet is small, it is prevented that the clearance is shown through the document sheet to adversely affect the reading of the image, thereby improving the reading capability of the scanner portion 2 as an image reading apparatus.

Each of the guide parts 42 constituting the guide device is suspended from the driving shaft of the feeder roller 36. Hence, the guide part 42 can be accurately and easily disposed at such a position that under surfaces of the guide parts 42 temporarily separate the document sheet from the outer circumferential surface of the feeder roller 35.

According to the multifunction apparatus 1 of the embodiment, the feeder roller 35 and the guide parts 42, which are disposed to be opposed to the reading line in the platen glass 20, are inhibited from affecting the read image, i.e., causing the show-through. Further, the restricting members 47 provided to the feeder roller 35 as a second driving roller prevent the irregularity in the feeding of the document sheet which occurs upon elimination of the circumferential elastic deformation of the feeder roller in the case where the feeding rate is varied, including a case where feeding of the document sheet is temporarily suspended. Thus, the reading capability of the scanner portion 2 as an image reading apparatus is enhanced.

The invention is not limited to the details of the above-described embodiment, but may be otherwise embodied with various modifications, without departing from the scope and spirit of the invention as defined in the appended claims.

For instance, in the above-described embodiment, two film materials 46 are respectively provided at the opposite sides of the feeder roller 35. However, in place of the film materials 46, a single film material having a small thickness may be disposed to extend across inner ends of the respective guide parts on the opposite sides of the feeder roller 35, and thereby to cover the both of the two clearances 45.

What is claimed is:

1. An image reading apparatus comprising:
a document feeder which includes a feeder roller, and is configured to feed a document sheet with an image thereon, along an outer circumferential surface of the feeder roller;
a transparent plate;
a reading unit which is disposed under the transparent plate and is configured to read the image on the document sheet passing a reading position, wherein the reading position corresponds to a reading line present in an upper surface of the transparent plate and extending in a direction perpendicular to a direction in which the document sheet is fed;
a guide device which has a guide surface and is configured to guide the document sheet through a feed pathway to the reading position, the feed pathway being defined between the transparent plate and the guide surface;
a clearance between the feeder roller and the guide device in an axial direction of a driving shaft of the feeder roller, wherein the axial direction of the driving shaft is parallel to the reading line, and
an exposure preventer which prevents the clearance between the guide device and the feeder roller in the direction of the driving shaft of the feeder roller, from being exposed to the reading unit,
wherein the outer circumferential surface of the feed roller includes a first opposed portion, the guide surface of the guide device includes a second opposed portion, and the exposure preventer includes a third opposed portion, and the first opposed portion, the second opposed portion, and the third opposed portion are aligned along the reading line;
wherein the reading unit is configured to emit light onto the document sheet passing the reading line, and each of the first opposed portion, the second opposed portion and the third opposed portion reflect the light transmitted through the document sheet.

2. The apparatus according to claim 1, wherein the document feeder is configured to feed the document sheet into a clearance between the transparent plate and a combination of the feeder roller and the guide device, and the reading unit and the combination of the feeder roller and the guide device are opposed to each other with the transparent plate interposed therebetween.

3. The apparatus according to claim 2, wherein the guide device comprises a pair of guide parts each of which comprises a suspending portion which is disposed on one of two opposite sides of the feeder roller in the axial direction of the driving shaft of the feeder roller, which is parallel to a width direction of the document sheet as fed over the reading unit, and holds the driving shaft to suspend therefrom.

4. The apparatus according to claim 2, wherein the guide device comprises a pair of guide parts each of which comprises an abutting portion abutting the transparent plate to position the guide part.

5. The apparatus according to claim 1, further comprising a sheet feed tray and a catch tray which are disposed in vertical relation, wherein the document feeder comprises a substantially U-shaped feed pathway including a curved portion and extending from the sheet feed tray to the catch tray via curved portion, and the feeder roller is disposed at the curved portion so as to feed the document sheet along the curved portion while reversing the document sheet.

6. The apparatus according to claim 1, wherein the exposure preventer comprises at least one cover which is disposed in the second opposed portion of the guide surface so as to cover the clearance.

7. The apparatus according to claim 6, wherein said at least one cover has the substantially same color which the outer circumferential surface of the feeder roller and the second opposed portion of the guide surface have.

8. The apparatus according to claim 6, wherein said at least one cover is a film material which is fixed to the second opposed portion of the guide surface, and extends to reach the outer circumferential surface of the feeder roller or an immediate vicinity thereof.

9. The apparatus according to claim 8, wherein the feeder roller has, at an end thereof in the axial direction of the feeder roller, a stepped portion having a diameter smaller than that of the other portion of the feeder roller, and an end portion of said at least one cover in the axial direction is supported by the stepped portion.

10. The apparatus according to claim 8, wherein the second opposed portion of the guide surface has a parallel portion which contacts the document sheet, and a recessed portion in which said at least one cover is fixed so that a surface of the cover is located inward of the parallel portion in a radial direction of the feeder roller.

11. The apparatus according to claim 1, wherein the first opposed portion, the second opposed portion, and the third opposed portion are opposed, via the transparent plate, to the recording unit, in a direction perpendicular to the transparent plate.

12. The apparatus according to claim 11, wherein the second opposed portion of the guide surface includes an inclined portion connecting the parallel portion and the recessed portion and inclined in a direction to increase a distance between the transparent plate and the second opposed portion, from the parallel portion to the recessed portion.

13. The apparatus according to claim 1, wherein both of the outer circumferential surface of the feeder roller and at least the second opposed portion of the guide surface are white.

14. The apparatus according to claim 1,
wherin the document feeder comprises the feed pathway along which the document sheet is fed from a sheet feed tray to a catch tray via the reading position, the document feeder changing a feeding rate during feeding of a single document sheet, the apparatus further comprising:
an upstream feeding portion comprising a driving roller and a first contact member elastically contacting the driving roller when the document sheet is not nipped therebetween, the driving roller and the first contact member configured to separate each of the plurality of document sheets stacked on the sheet feed tray, from the other document sheets, and feed the document sheets one by one; and
a downstream feeding portion comprising the feeder roller, which is configured to pass the document sheet, which has been fed by the upstream feeding portion, to the catch tray via the reading position, and a second contact member elastically contacting the feeder roller when the document sheet is not nipped therebetween,
wherein the feeder roller comprises:
the driving shaft; and
an elastic roller body covering the driving shaft such that the feeder roller is integrally rotatable, an outer circumferential surface of the roller body being opposed to the reading unit; and
a restricting member for restraining rotational displacement of the outer circumferential surface of the roller body relative to the driving shaft due to an elastic deformation of the roller body in a circumferential direction of the roller body during feeding of the document sheet, the restricting member rotating with the driving shaft.

15. The apparatus according to claim 14, wherein the restricting member also has the substantially same color which the outer circumferential surface of the feeder roller and the second opposed portion of the guide device have.

16. The apparatus according to claim 14, wherein the restricting member is a circular member which rotates with the driving shaft and is concentric with the roller body, has an external diameter smaller than that of the roller body, and is fixed to both end faces of the roller body in an axial direction of the roller body.

17. The apparatus according to claim 16, wherein the restricting member is an annular disc whose internal diameter is substantially equal to an external diameter of the driving shaft.

18. The apparatus according to claim 16, wherein an outer circumferential surface of the restricting member is located near the outer circumferential surface of the roller body.

19. The apparatus according to claim 18, further comprising a cover which is fixed to the second opposed portion of the guide surface of the guide device so as to cover the clearance between the feeder roller and the guide device,
wherein the cover is supported by the outer circumferential surface of the restricting member which has an external diameter smaller than that of the roller body by an amount corresponding to a thickness of the cover.

20. The apparatus according to claim 14, wherein the restricting member is adhered to the roller body.

21. The apparatus according to claim 14,
wherein the feed pathway is substantially U-shaped and comprises a first portion in which the document sheet is configured to be fed in a first direction, a second portion in which the document sheet is configured to be fed in a second direction, and a curved portion, the first and second directions being opposite to each other, and the curved portion is configured to reverse the document sheet and feed the document sheet to the second portion via downstream feeding portion after the document sheet is fed along the first portion by the upstream feeding portion, and
wherein the second driving roller is disposed such that a center of rotation of the second driving roller is configured to substantially coincide with a center of reversing of the document sheet at the curved portion, a radius of the roller body of the second driving roller is configured to substantially equal a curvature radius of the document sheet at the curved portion.

22. The apparatus according to claim 1, wherein the guide device is configured to temporarily separate the document sheet from the outer circumferential surface of the feeder roller, and regulate motion of the document sheet at the reading position.

23. The apparatus according to claim 22, wherein the guide device suspends from the driving shaft of the feeder roller.

24. The apparatus according to claim 1, wherein the outer circumferential surface of the feeder roller, and at least the second opposed portion of the guide surface have a substantially same color.

25. The apparatus according to claim 6, wherein the guide device comprises a pair of guide parts that are respectively disposed on two opposite sides of the feeder roller in the axial direction of the driving shaft,
wherein the clearance between the feeder roller and the guide device comprises a pair of clearances between the feeder roller and the guide parts, and
wherein said at least one cover covers both of the clearances between the feeder roller and the guide parts.

26. The apparatus according to claim 25, wherein said at least one cover comprises two covers respectively attached to the guide parts,
and wherein the two covers cover the clearances between the feeder roller and the respective guide parts.

27. The apparatus according to claim 12, wherein the parallel portion, the inclined portion, and the recessed portion of the second opposed portion of the guide surface are provided on each of opposite sides of the feeder roller in the axial direction of the feeder roller, and a distance between axially inner ends of the respective parallel portions is smaller than a width of a document sheet having a minimum width.

* * * * *